United States Patent [19]

Renzo et al.

[11] Patent Number: 5,430,912
[45] Date of Patent: Jul. 11, 1995

[54] CLAMPING RINGS

[75] Inventors: Bernard Renzo, Nantes; Joel Breheret, Treillieres, both of France

[73] Assignee: Draftex Industries Limited, Edinburgh, Scotland

[21] Appl. No.: 241,455

[22] Filed: May 11, 1994

Related U.S. Application Data

[63] Continuation of Ser. No. 985,599, Dec. 3, 1992, abandoned.

[30] Foreign Application Priority Data

Dec. 3, 1991 [GB] United Kingdom ................ 9125651

[51] Int. Cl.⁶ .............................................. F16L 33/02
[52] U.S. Cl. .................................... 24/20 R; 24/20 EE
[58] Field of Search ................ 24/20 R, 20 EE, 16 R, 24/20 S, 20 W, 23 R, 23 EE, 20 TT

[56] References Cited

U.S. PATENT DOCUMENTS

| | | | |
|---|---|---|---|
| 4,890,360 | 1/1990 | Calmettes et al. | 24/20 R |
| 5,105,509 | 4/1992 | Lilley | 24/20 R |
| 5,177,836 | 1/1993 | Kemmerich | 24/20 R |
| 5,191,684 | 3/1993 | Kenwright | 24/20 R |
| 5,274,886 | 1/1994 | Oetiker | 24/20 R |

*Primary Examiner*—Laurie K. Cranmer
*Attorney, Agent, or Firm*—Leydig, Voit & Mayer, Ltd.

[57] ABSTRACT

A clamping ring, for clamping an end collar of a protective bellows to one end of a universal joint in a vehicle transmission, is made of resilient material having two overlapping end portions. One end portion has a tongue extending through a slot defined in the other end portion. In its relaxed state, the material of the ring holds the tongue in an initial position in the slot. When the ring is placed over the end collar of the bellows, the ring expands slightly to permit this, the tongue moving towards a "high" stop at one end of the slot. The ring then resiles slightly so as to hold itself on the bellows. When the bellows, with the ring in position, is placed over the end of the universal joint, the ring once more expands slightly to permit this. The ring is then tightened by moving the end portion until a hook engages a shoulder on the other end portion, the tongue moving towards a "low" stop at the other end of the slot.

8 Claims, 10 Drawing Sheets

CLAMPING RINGS

This is a continuation of application Ser. No. 07/985,599 filed on Dec. 3, 1992, abandoned.

BACKGROUND OF THE INVENTION

The invention relates to clamping rings. Examples of clamping rings embodying the invention to be described in more detail below are for clamping the opposite ends of protective bellows to universal joints in motor vehicle transmissions such as front wheel drive transmissions.

BRIEF SUMMARY OF THE INVENTION

According to the invention, there is provided a clamping ring for clamping the periphery of a flexible article to a rigid circumferential surface, comprising resilient strip-shaped material having two end portions and arranged with the two end portions overlapping so as to define the ring and such that the extent of the overlap can be varied to increase and decrease the internal diameter of the ring, holding means acting between the overlapping end portions to hold them in a predetermined initial relative position before the ring is placed over the periphery of the flexible article but enabling the end portions to move relatively from the initial position to a second relative position in which the ring has an increased internal diameter to permit the ring to be placed around the periphery of the flexible article but in which the ring is held on the flexible article by the resilience of the ring, and locking means operable after the flexible article with the ring thereon has been placed over the circumferential surface to lock the end portions in a third relative position in which the end portions have moved relatively to reduce the internal diameter of the ring so as to clamp the article to the circumferential surface, the holding means being constituted by the resilience of the material which is such that, in its relaxed state, the two end portions rest in the said initial relative position.

According to the invention, there is also provided a clamping ring for clamping the periphery of a flexible article to a circumferential rigid surface, comprising resilient strip-shaped material having two end portions and arranged with the two end portions overlapping to define the ring, the resilience of the material holding the end portions in such initial relative positioning that the internal diameter of the ring is greater than that of the periphery of the flexible article, mutually interacting locating means carried respectively by the strip-shaped material and the periphery of the flexible article so as to locate the ring on the periphery of the article when the two end portions are held in the said initial relative positioning by the resilience of the material, and locking means for locking the end portions together after the flexible article with the ring located thereon has been placed over the rigid surface and after the end portions have been moved to a different relative positioning such that the internal diameter of the ring has been reduced against the resilience of the material to clamp the article to the rigid surface.

According to the invention, there is further provided a clamping ring for clamping the periphery of a flexible article to a rigid circumferential surface, comprising resilient ring-shaped material which, in its relaxed state, is non-concentric such that the shortest dimension across the inside of the ring is no greater than the outside diameter of the periphery of the flexible article before the latter is placed onto the rigid surface such that the ring lightly grips the periphery of the flexible article at a position corresponding to this shortest dimension, the internal peripheral dimension of the ring being such that, after the flexible article with the ring thereon has been placed over the rigid surface and forced into concentric shape against the resilience of the material, it tightly clamps the periphery of the flexible article to the rigid surface.

BRIEF DESCRIPTION OF THE DRAWINGS

Clamping rings for clamping the opposite ends of protective bellows around universal joints in motor vehicle front wheel drive transmission arrangements will now be described, by way of example only, with reference to the accompanying drawings in which.

DESCRIPTION OF PREFERRED EMBODIMENTS

In the embodiments to be described, items in each embodiment corresponding to items in any other embodiment have the same reference numerals.

Figure 1:
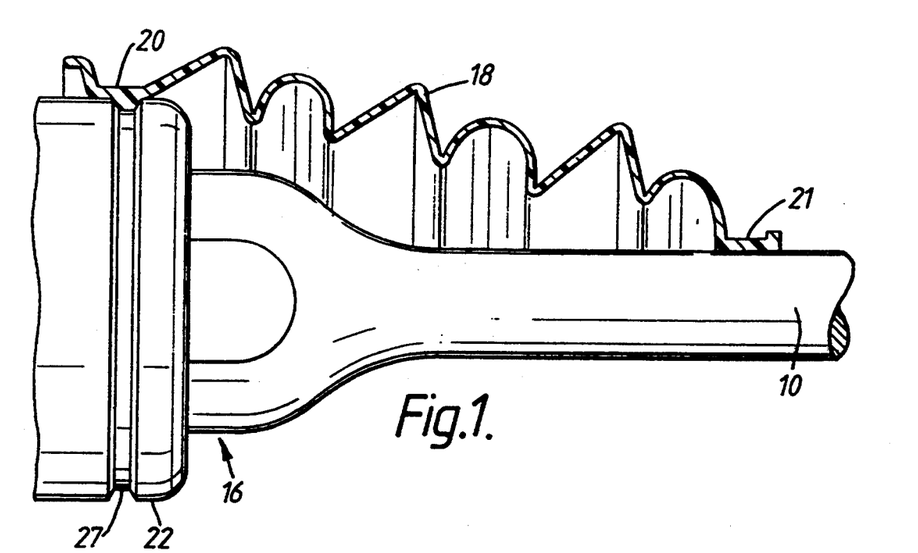
FIG. 1 illustrates a protective bellows mounted in position around the universal joint in a motor vehicle front wheel drive transmission arrangement.

FIG. 1 shows part of the front wheel drive transmission of a motor vehicle. The driven shaft 10 from the gear box 12 drives a front wheel of the vehicle via a universal joint 16. In order to protect the mechanism of the universal joint 16, it is encased in a bellows 18 made, for example, of thermoplastics material. The bellows has collars 20 and 21 at each of its opposite ends which are respectively positioned around an end 22 of the universal joint and the shaft 10 and are clamped thereto by clamping rings (not shown in FIG. 1).

Figure 2A:
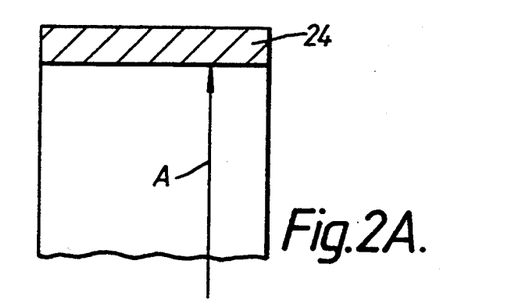
FIG. 2A is a diagrammatic partial cross-section, taken on the line IIA—IIA of FIG. 5, through one of the clamping rings before it is fitted onto the protective bellows.

FIG. 2A shows, in diagrammatic form only, part of one of the clamping rings 24 which is shown to have an inside diameter A.

FIG. 2B shows, again in diagrammatic form only, part of one end of the bellows 18 and the corresponding collar 20 which has an outside diameter B.

Figure 3A:
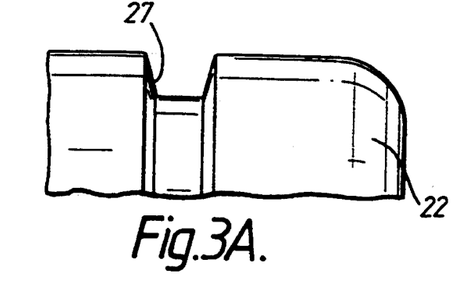
FIG. 3A is a diagrammatic side view of one end of the universal joint of the transmission shown in FIG. 1 and onto which an end of the bellows is to be clamped.
Figure 3B:
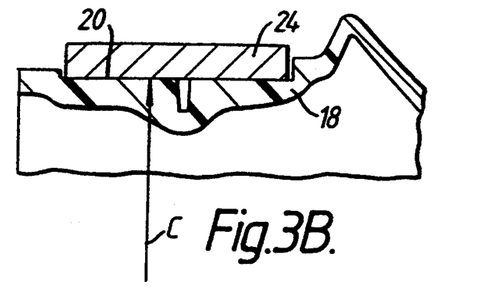
FIG. 3B is a diagrammatic partial cross-section through one of the clamping rings installed on the bellows of FIG. 2B before the bellows is placed in position universal joint of FIG. 3A.

FIG. 3A shows part of the end 22 of the universal joint 16, and FIG. 3B shows the clamping ring 24 in position around the collar 20 of the bellows. In this position, the outer diameter of the collar 20 is C. The end 22 of the universal joint has a locating groove 27.

Figure 4:
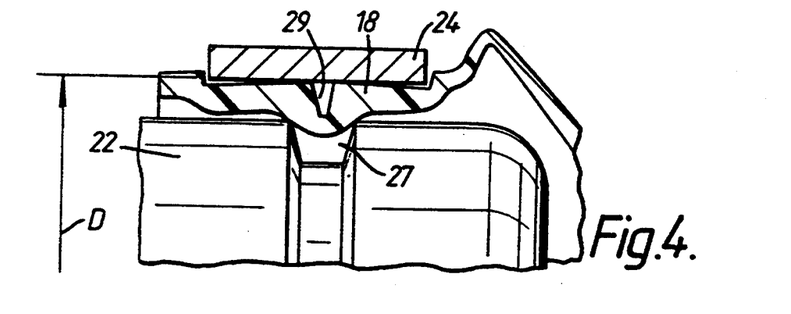
FIG. 4 is a diagrammatic partial cross-section showing the bellows and, clamping ring of FIG. 3B fitted in position on the universal joint of FIG. 3A.

FIG. 4 shows the bellows placed on to the end 22 of the universal joint 16 by means of the clamping ring shown diagrammatically in FIG. 3B, the outer diameter of the collar 22 being D in this situation.

Figure 2B:
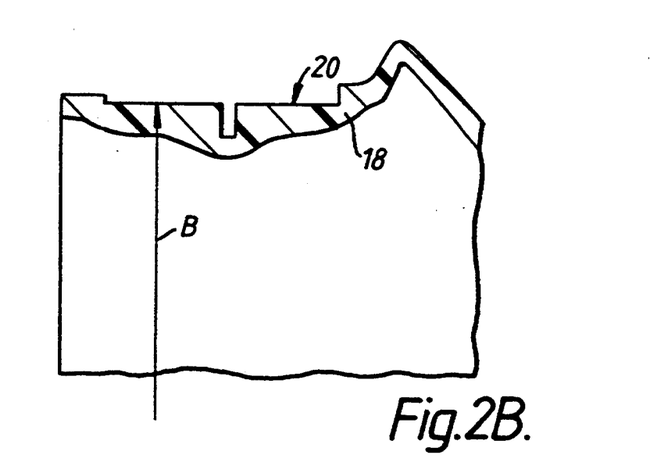
FIG. 2B is a diagrammatic partial cross-section through an end collar of the bellows before it is fitted in position.

The clamping rings now to be described are arranged so that diameter A (FIG. 2A) is substantially equal to or slightly less than diameter B (FIG. 2B). When the clamping ring is placed on the collar 20, the clamping ring is able to expand slightly to ease its fitting onto the collar, but then resiles slightly so as to be retained on the collar 20. The situation shown in FIG. 3B is thus produced, with the diameter C being slightly less than or possibly equal to diameter B and slightly greater than or possibly equal to diameter A. The bellows, with the clamping ring in position, is then placed on to the end 22 of the joint 16, to produce the situation shown in FIG. 4 in which a shoulder of the bellows locates itself in the groove 27 (FIG. 3A). During this assembly operation, the clamping ring 24 expands to aid the assembly, and diameter D (FIG. 4) is greater than diameter C. The clamping ring is then tightened (as will be explained) to secure the bellows end on the universal joint. The collar 20 of the bellows has a slot 29 which becomes partially closed during this tightening operation.

Figure 5:
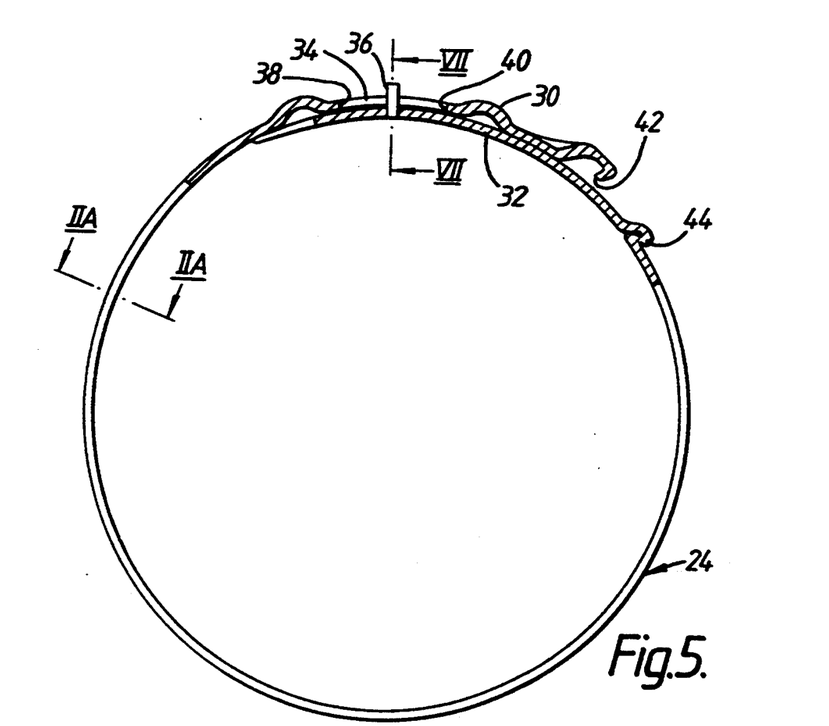
FIG. 5 is a view of one, of the clamping rings, taken in section along the line V—V of FIG. 8 but before the ring is placed on the bellows shown in that Figure, end portions of the ring being shown in an initial relative position.

FIG. 5 shows one of the clamping rings 24. It is made of flexible material (preferably metal) and is generally circular in end view, but with overlapping portions 30 and 32. Portion 30 is formed with a slot 34 into which a tongue 36, bent out of portion 32, extends.

The slot 34 defines a "low" stop 38 and a "high" stop 40 at opposite ends of the groove 34. The outer overlapping portion 30 has a hooked end 42 for engaging a shoulder 44 as will be explained.

Figure 5A:
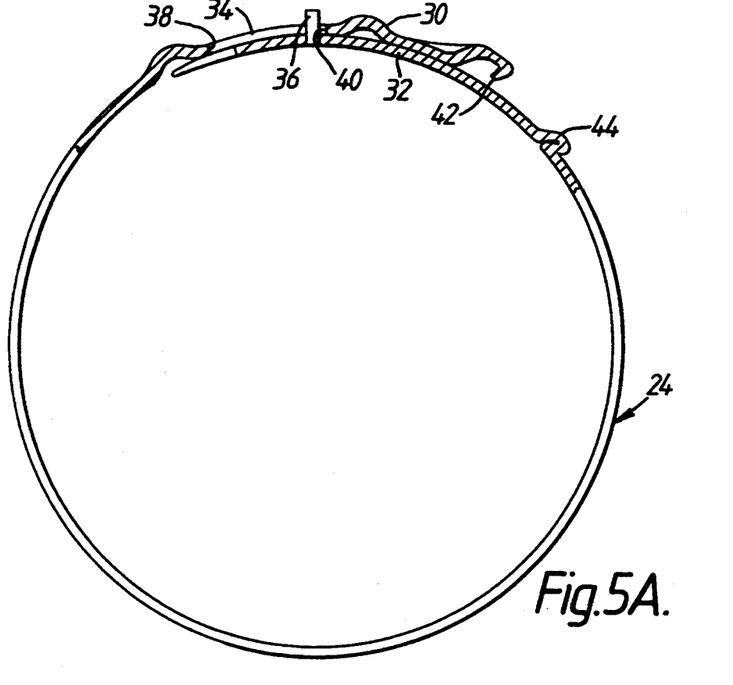
FIG. 5A is a view corresponding to FIG. 5 but showing the end portions of the clamping ring in a second relative position.

The clamping ring shown in FIG. 5 is arranged so that, in its relaxed state before it is placed in position on the bellows, the tongue 36 lies midway between the low and high stops 38,40. In this position, portions 30 and 32 have an initial relative position and the internal diameter of the clamping ring has the value A (see FIG. 2A). When the clamping ring is placed onto the collar 20 at the end of the bellows, as shown in FIG. 3B, the clamping ring is expanded to aid this assembly and the tongue 36 moves freely towards the high stop 40 which constitutes a first limit; portions 30 and 32 are now in a second relative position as shown in FIG 5A. Once the clamping ring is in position on the collar 22 (FIG. 3B), it resiles slightly and the tongue 36 moves back towards the position midway between the stops 38 and 40. The clamping ring is thus held adequately in position by its own resilience on the collar 20.

The bellows, with the clamping ring 24 in position, can then be easily located on the end 24 of the universal joint 16, as shown in FIG. 4, the clamping ring expanding slightly to aid this assembly process and the tongue 36 moving towards the high stop 40.

Figure 5B:
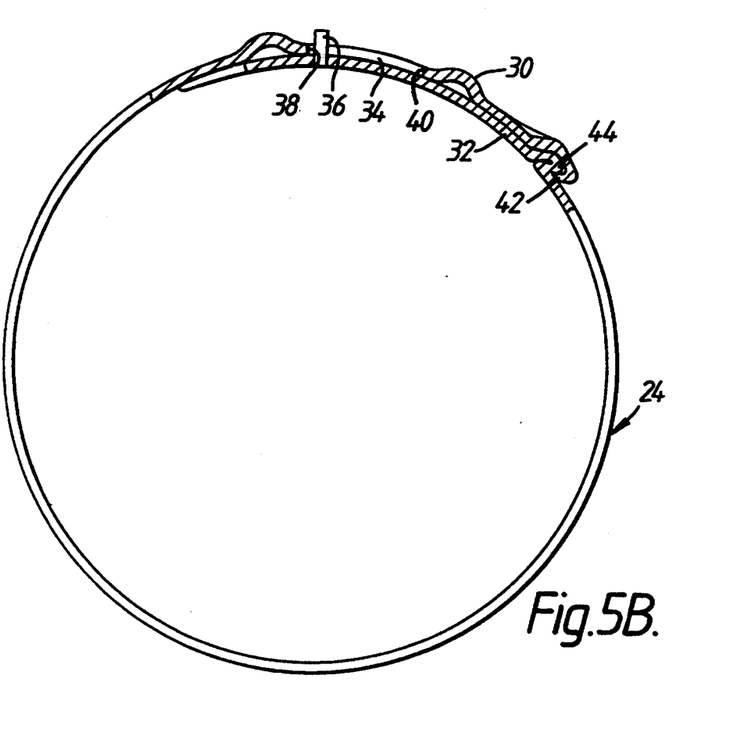
FIG. 5B is a view corresponding to FIG. 5 but showing the end portions of the ring in a third relative position.

Assembly is then completed by tightening the clip until the hook 42 (FIG. 5) engages over the shoulder 44, so that the portions 30 and 32 assume a third relative position and tongue 36 moves towards the low stop 38 constituting a second limit, all as shown in FIG. 5B.

Figure 7:
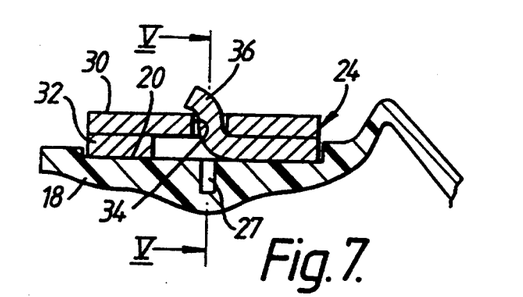
FIG. 7 is a partial cross-section on the line VII—VII of FIG. 5, and also illustrating part of the bellows.

FIG. 7 shows the tongue 36 of FIG. 5 slidably arranged in the groove 34.

In FIG. 5, the tongue 36 is held at the midpoint of slot 34 by the resilience of the material of the clamping ring.

Figure 6:
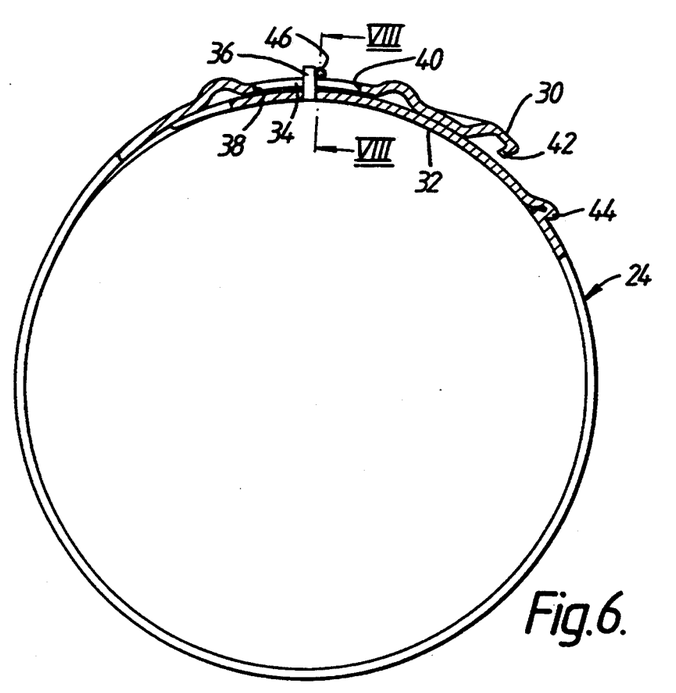
FIG. 6 is a view of one of the clamping rings, taken in section along the line VI—VI of FIG. 9 but before the ring is placed on the bellows shown in that Figure, the end portions being shown in an initial relative position.
Figure 6A:
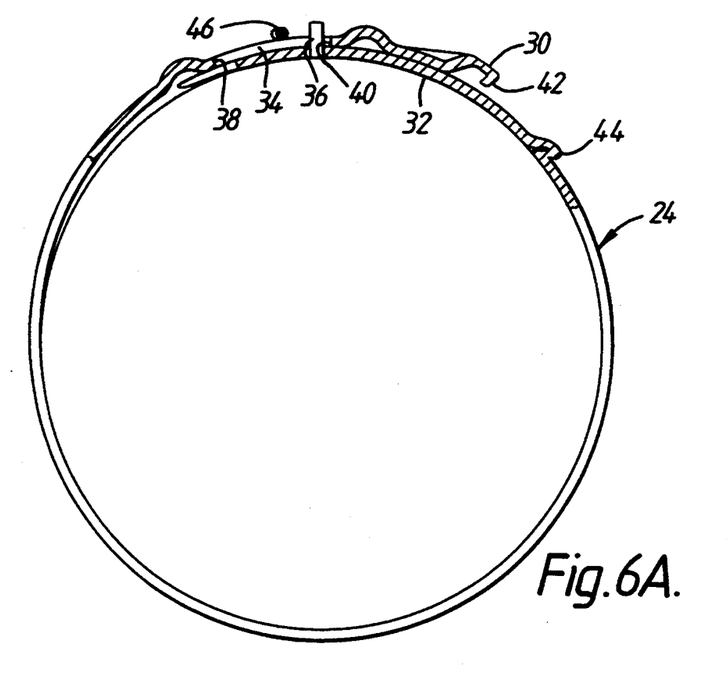
FIG. 6A is a view corresponding to FIG. 6 but showing the end portions in a second relative position.
Figure 6B:
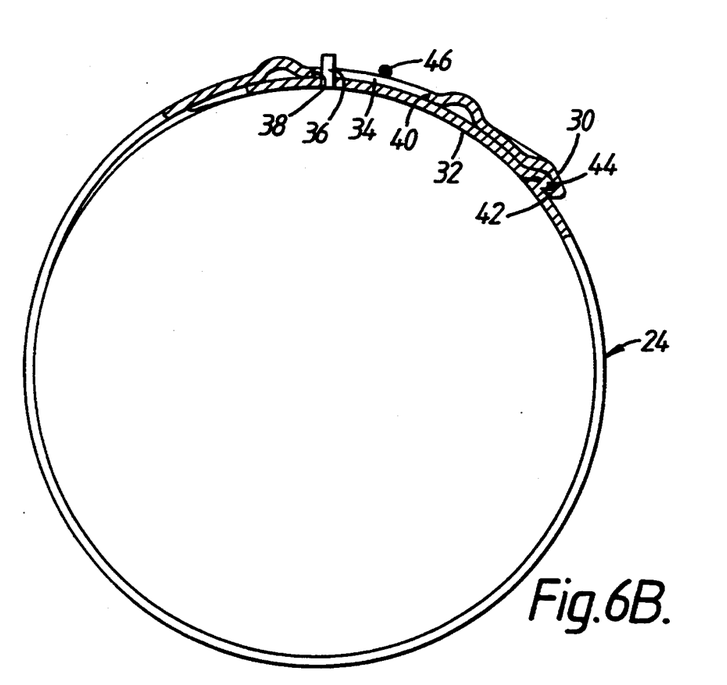
FIG. 6B is a view corresponding to FIG. 6 but showing the end portions in a third relative position.
Figure 8:
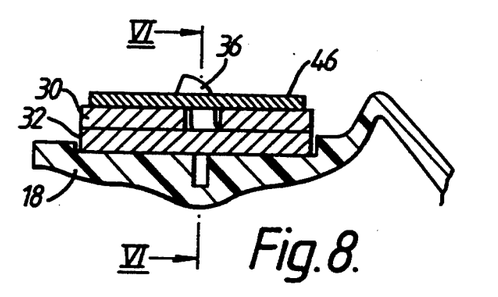
FIG. 8 is a partial cross-section on the line VIII—VIII of FIG. 6, and also illustrating part of the bellows.

FIG. 6 shows another way in which the tongue 36 may be held at the mid-point of the slot 34 with the portions 30 and 32 in an initial relative position. This is achieved by a keeper 46 which extends across the slot 34, as illustrated most clearly in FIG. 8. The keeper 46 may be made of metal or plastics and may be glued or similarly fixed in position and holds the tongue 36 against the inherent resilience of the material of the clamping ring. When the clamping ring is placed over the collar 20 at the end of the bellows, as shown in FIG. 3B, the tongue 34 either breaks the keeper 46 or ejects it from its glued position on the clamping ring. As shown in FIG. 6A, the tongue 36 moves towards the high stop 40 constituting the first limit, and the end portions 30 and 32 assume the second relative position. The operation is otherwise as described with reference to FIGS. 5 and 7. As shown in FIG. 6B, assembly is completed by tightening the clip until hook 42 engages shoulder 44, so that tongue 36 moves towards the low stop 38 constituting the second limit; portions 30 and 32 now assume the third relative position.

Figure 9:
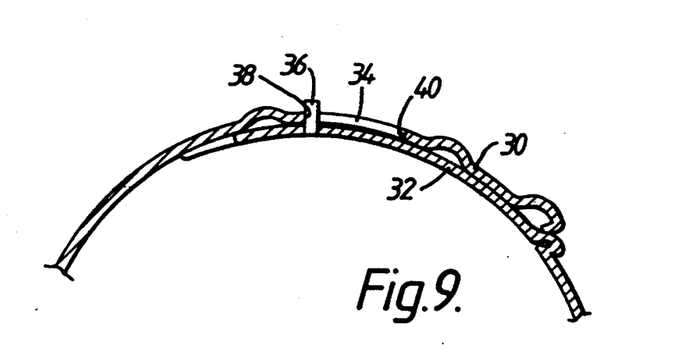
FIG. 9 is a view corresponding to FIGS. 5 and 6 of part of another form of the clamping ring, shown in the configuration which it has before it is fitted onto the bellows.

In the clamping ring shown in FIG. 9, the arrangement is such that the tongue 36, instead of being situated midway between the high and low stops 38 and 40 (constituting first and second limits respectively when the clamping ring is in its relaxed state before fitment onto the bellows, is in engagement with the low stop 38 the end portions 30 and 32 are thus now in their initial relative position.

Figure 10:
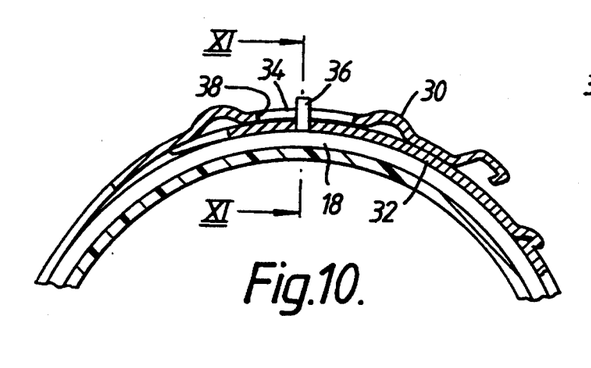
FIG. 10 is a sectional view corresponding to FIG. 9 taken on the line X—X of FIG. 11 and showing the clamping ring of FIG. 9 fitted onto a bellows.
Figure 11:
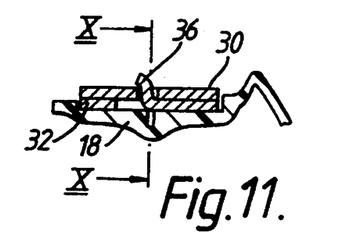
FIG. 11 is a diagrammatic partial cross-section on the line XI—XI of FIG. 10.
Figures 12, 13:
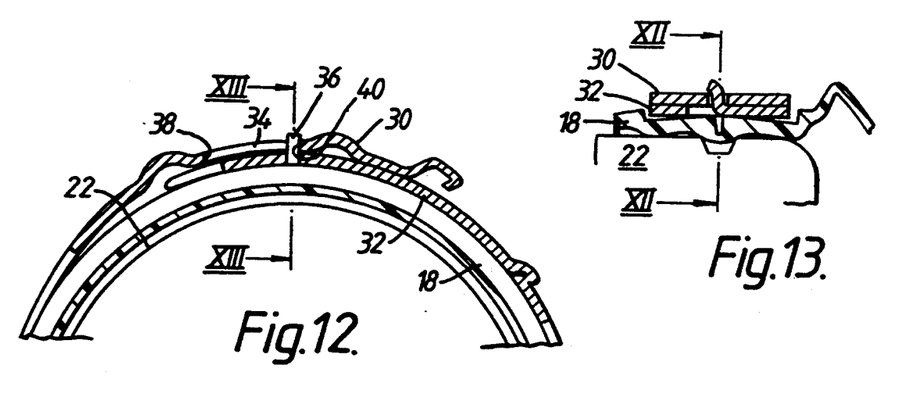
FIG. 12 is a sectional view taken on the line XII—XII of FIG. 13 and corresponding to FIGS. 10 and 11, showing the clamping ring in position on a bellows and with the bellows in position on the transmission drive arrangement.
FIG. 13 is a cross-section on the line XIII—XIII of FIG. 12.
Figures 14, 15:
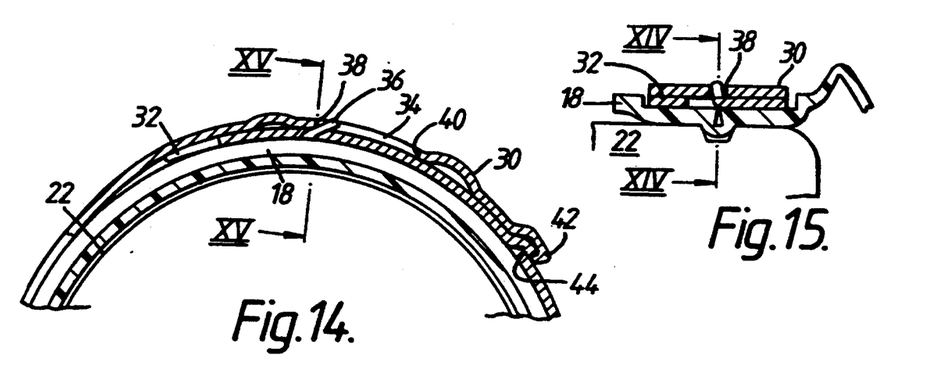
FIGS. 14 and 15 correspond to FIGS. 12 and 13 but show the cramping ring in its locked configuration.

When the clamping ring is placed onto the collar 20 of the bellows (as shown in FIG. 3B), the clamping ring is expanded so that the tongue 36 moves approximately to the position midway between the stops 38 and 40 as shown in FIGS. 10 and 11; the end portions 30 and 32 are now in their second relative position. When the bellows, with the clamping ring in position on it, is placed over the end of the universal joint 16, as shown in FIG. 4, the tongue 36 now moves towards the high stop 40 as the clamping ring expands—as shown in FIGS. 12 and 13. The clamping ring is then tightened. This process brings the tongue 36 once more into contact with the low stop 38. The tongue 36 is either deformed by this contract, as shown in FIG. 14 or is completely broken off; in either case, continued overlapping movement of the portions 30 and 32 takes place until the hook 42 engages over the shoulder 44; portions 30 and 32 are now in their third relative position.

Figure 16:
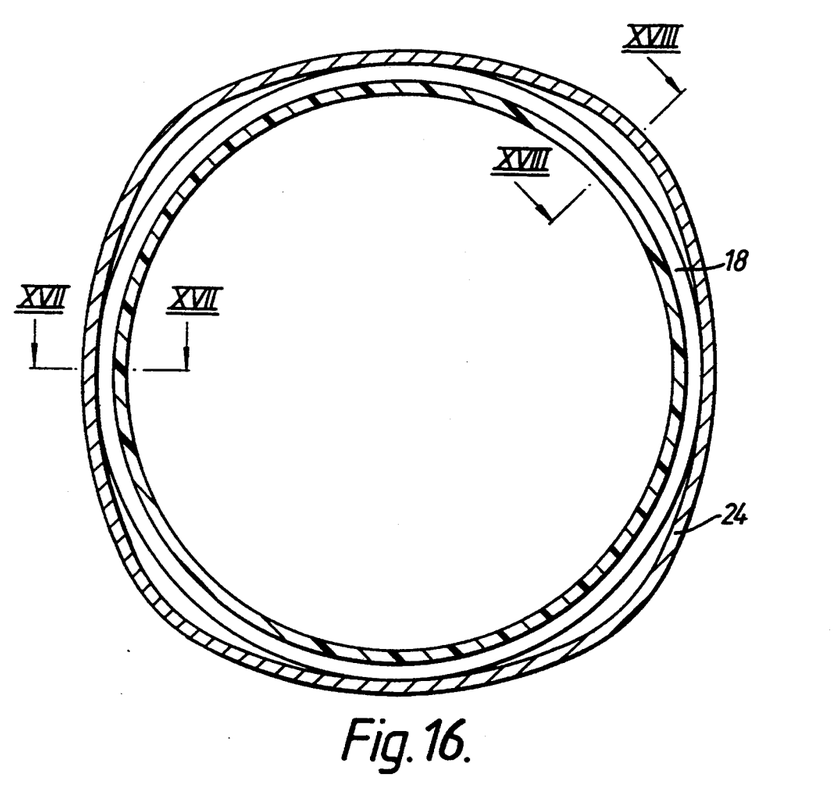
FIG. 16 is an end view of another of the clamping rings.
Figure 17:
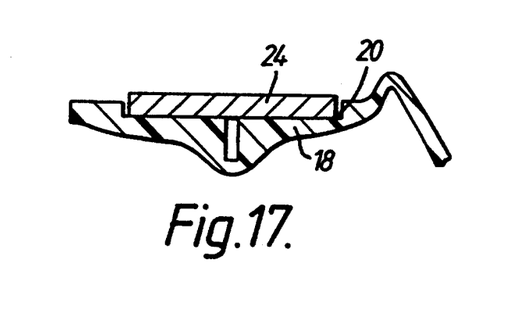
FIG. 17 is a partial diagrammatic cross-section taken on the line XVII—XVII of FIG. 16, showing the clamping ring of FIG. 18 in position on a bellows.
Figure 18:
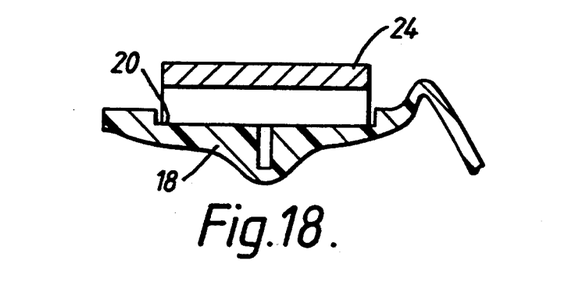
FIG. 18 corresponds to FIG. 17 but is a section on the line XVIII—XVIII of FIG. 16.

FIG. 16 shows another form of the clamping ring. In this form, the clamping ring is made of resilient material, such as metal, in the form of a complete ring but non-concentric so that the distance between two opposed points of the inside of the ring is equal to or very slightly smaller than the external diameter B, see FIG. 2B. In use, the clamping ring of FIG. 16 is placed over the collar 20 of the bellows. Where the distance across the clamping ring is smallest, the clamping ring will seat tightly on the collar 20, as shown in FIG. 17. Where the clamping ring has the greater inside dimension, the ring will be spaced from the collar 20, as shown in FIG. 18. Because the clamping ring engages the collar 20 tightly at at least one position (shown in FIG. 17), it is held firmly on the collar prior to and during assembly of the bellows onto the end of the universal joint. When the latter assembly takes place, the clamping ring becomes exposed to forces which tend to increase its concentricity, and the clamping ring thus moves tightly into contact with the collar 20 around the whole of its circumference.

Figure 19:
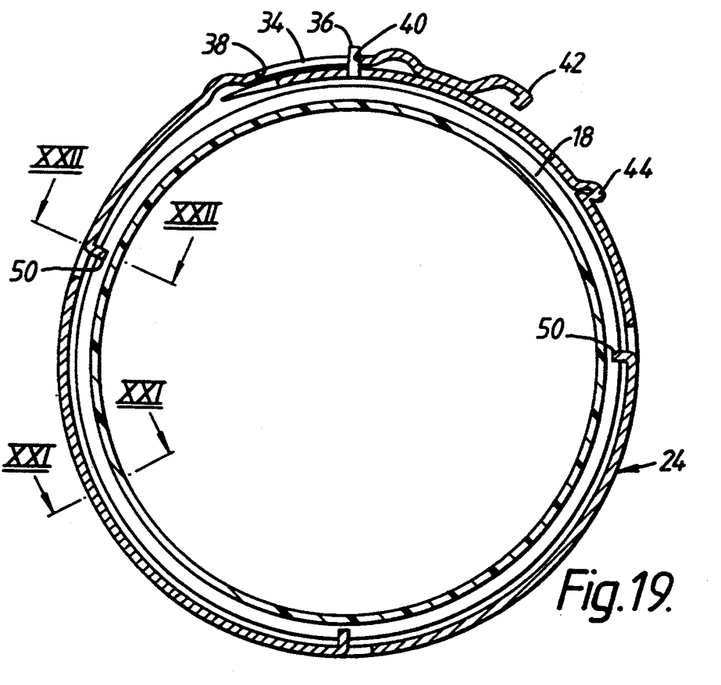
FIG. 19 is a cross-sectional view of another of the clamping rings, in position on a bellows.
Figure 21:
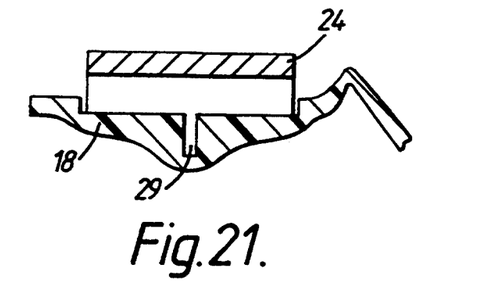
FIG. 21 is a partial cross-section on the line XXI—XXI of FIG. 19.
Figure 22:
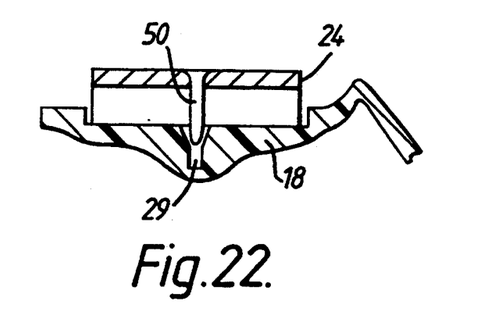
FIG. 22 is a partial cross-section on the line XXII—XXII of FIG. 19.

In the clamping ring shown in FIG. 19, the tongue 36 is in contact with the high stop 40 in the relaxed state of the ring and also after it has been forced onto the collar 20 of the bellows. This form of clamping ring is not held in position on the collar 20 by its resilience but by additional tongues 50 which engage the groove 27 in the collar 20, as shown in FIG. 22, the clamping ring being spaced from the surface of the collar 20 at other circumferential positions as shown in FIG. 21. After the bellows with the clamping ring in position is placed over the end of the universal joint 16, corresponding to the situation shown in FIG. 4, the clamping ring is tightened ill the manner already explained until the hook 42 engages the shoulder 44, the tongue 36 moving towards the low stop 38 so as to bring the internal surface of the clamping ring into tight clamping engagement with the collar 22.

Figure 20:
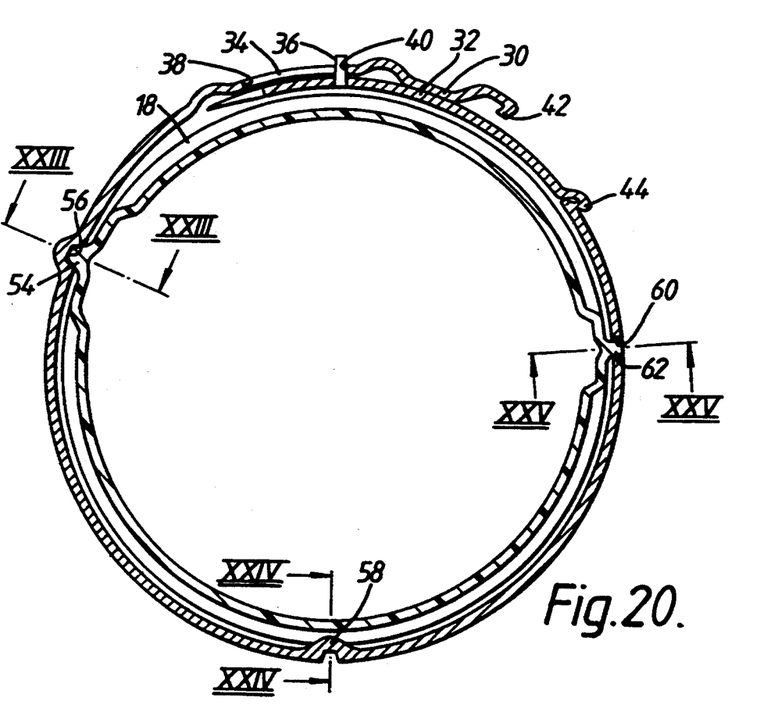
FIG. 20 corresponds to FIG. 19 but shows a further one of the clamping rings in position on the bellows.
Figure 23:
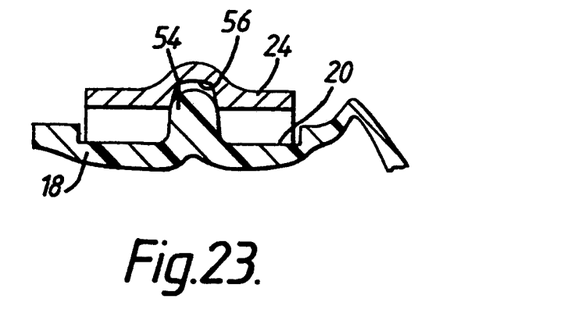
FIG. 23 is a partial cross-section on the line XXIII—XXIII of FIG. 20.
Figure 24:
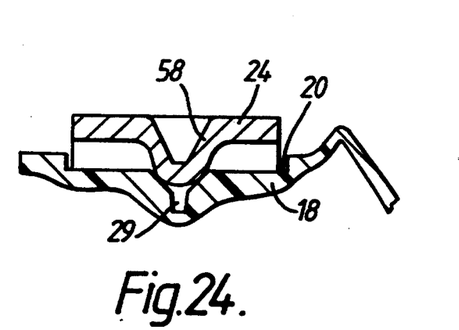
FIG. 24 is a partial cross-section on the line XXIV—XXIV of FIG. 20.
Figure 25:
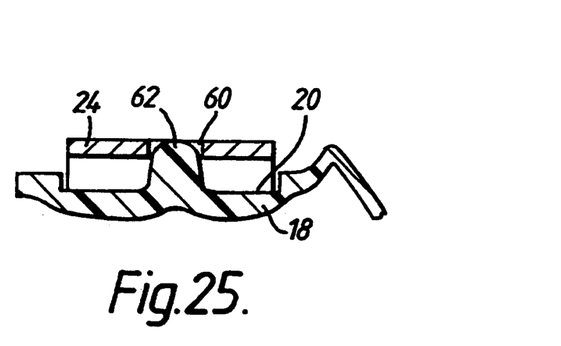
FIG. 25 is a partial cross-section on the line XXV—XXV of FIG. 20.

The clamping ring shown in FIG. 20 is similar to that shown in FIG. 19 in that, in its relaxed state, the tongue 36 engages the high stop 40, as it does also when the clamping ring has been placed onto the collar 20. In the latter position, the clamping ring of FIG. 20 is, like that of FIG. 19, generally spaced from the periphery of the collar 20. The clamping ring of FIG. 20 is located on the collar 20 in three different ways. Firstly, and as shown in FIG. 23, the collar is formed with a stud 54 which engages a locating cavity 56 in the clamping ring. Secondly, and as shown in FIG. 24, the clamping ring is formed with an inwardly directed peg 58 which engages the groove 29 in the collar 20. Thirdly, and as shown in FIG. 25, the clamping ring has a hole 60 through which a stud 62 formed in the collar 20 extends. The clamping ring shown in FIG. 20 may be modified so as to have only one or two of the three different locating arrangements shown in that FIG.

What is claimed is:

1. A clamping ring for clamping the periphery of a flexible article to a rigid circumferential surface, comprising resilient strip-shaped material having two end portions and arranged with the two end portions overlapping so as to define the ring and such that the extent of the overlap can be varied to increase and decrease the internal diameter of the ring, one of the end portions carrying a formation, the other of the end portions carrying stop means, the formation and the stop means mechanically interacting with each other to substantially prevent relative movement of the two end portions in a direction axially of the ring but permitting relative movement of the two end portions in a direction varying the extent of the said overlap between first and second limits respectively corresponding to a greater and a lesser internal diameter of the ring, substantially rigid member temporarily holding the overlapping end portions in a predetermined initial relative position against the inherent resilience of the material and before the ring is placed over the periphery of the flexible article, the substantially rigid member being capable of being over-ridden when the end portions move relatively from the initial position to a second relative position in which the ring has an increased internal diameter to permit the ring to be placed around the periphery of the flexible article and in which the ring is held on the flexible article by the resilience of ring, and locking means operable after the flexible article with the ring thereon has been placed over the circumferential surface to lock the end portions in a third relative position in which the end portion has moved relatively to reduce the internal diameter of the ring so as to clamp the article to the circumferential surface, the first limit corresponding to an internal diameter of the ring slightly greater than that corresponding to the second relative position and the second limit corresponding to an internal diameter of the ring slightly less than that corresponding to the third relative position.

2. A ring according to claim 1, in which the substantially rigid member is carried by the said other end portion and interacts with the said formation but is displaceable to permit the substantially rigid member to be over-ridden.

3. A ring according to claim 2, in which the substantially rigid member is displaced by being broken.

4. A ring according to claim 1, in which the formation carried by the one end portion comprises a tongue extending in a generally radial direction with respect to the ring and the stop means comprises means defining a slot in the other end portion through which slot the tongue extends, the opposite ends of the slot defining the said limits.

5. A ring according to claim 1, in which the formation carried by the one end portion comprises a tongue extending in a generally radial direction with respect to the ring and the stop means comprises opposite ends of a slot defined in the other end portion through which the tongue extends.

6. A ring according to claim 1, in which the locking means comprises hook means carried by one end portion and shoulder means carried by the other end portion, the hook means and the shoulder means being adapted for locking engagement.

7. A ring according to claim 1, in which the resilient material is metal.

8. A ring according to claim 1, for use where the periphery of the flexible article is an end collar of a flexible bellows for protecting a universal joint in a motor vehicle transmission and where the rigid surface is the surface in the transmission to which the end collar is to be clamped.

* * * * *